E. R. Wolfe,
Gate Spring.
N° 67,094. Patented July 23, 1867.
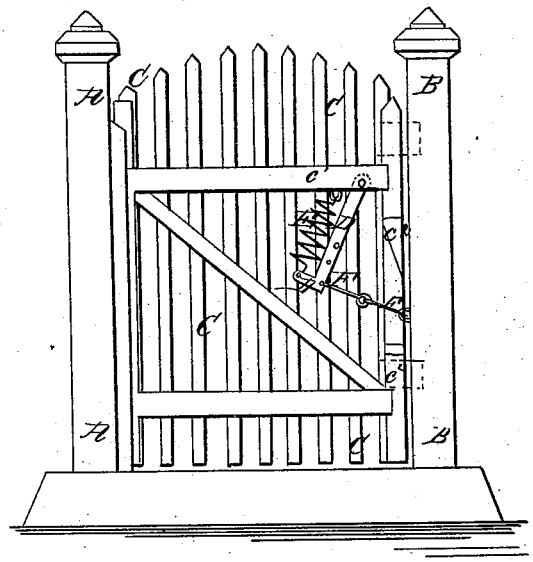
Witnesses
Wm Trewrn
S. Blockley
Inventor:
E. R. Wolfe
Per Munn & Co
Attorneys

United States Patent Office

E. R. WOLFE, OF PLYMOUTH, PENNSYLVANIA.

*Letters Patent No. 67,094, dated July 23, 1867.*

---

IMPROVEMENT IN GATES.

---

The Schedule referred to in these Letters Patent and making part of the same.

---

TO ALL WHOM IT MAY CONCERN:

Be it known that I, E. R. WOLFE, of Plymouth, in the county of Luzerne, and State of Pennsylvania, have invented a new and useful Improvement in Gates; and I do hereby declare that the following is a full, clear, and exact description thereof, which will enable those skilled in the art to make and use the same, reference being had to the accompanying drawings, forming part of this specification, in which the figure is a side view of my improved gate, part being broken away to show the construction.

Similar letters of reference indicate corresponding parts.

My invention has for its object to furnish an improved attachment for closing gates which shall be simple, cheap, efficient, easily constructed, symmetrical in appearance, and which shall have no projecting parts to catch upon passing objects, and it consists in the combination and arrangement of the bent lever, spiral spring, and jointed connecting-rod, or its equivalent, with each other, and with the gate and post, the whole being constructed and arranged as hereinafter more fully described.

A is the front post, B is the rear or hinge-post, and C is the gate, about the construction of which parts there is nothing new. D is a lever, the upper end of which is pivoted in a slot or recess formed in the upper horizontal bar $c^1$ of the gate C. The lower end of the bar D is bent at right angles, and has a hole formed through it for the attachment of the spiral spring E, the upper end of which is pivoted to the horizontal bar $c^1$, about two inches (in an ordinary-sized gate) in front of the joint at which the upper end of the lever D is pivoted to said bar. The long arm of the lever D has several holes formed through it, for the attachment of the connecting-rod F, so that by changing the point of attachment the effective force of the spring in closing the gate may be increased or diminished, as desired. The rear end of the connecting-rod is pivoted to the rear or hinge-post B, and is jointed at such a point as will allow the gate to swing fully back. The jointed rod is passed through a slot in the rear vertical bar $c^2$ of the gate-frame, said slot being made of such a length and form as will allow the rod F to play freely as the gate swings open and shut. If desired, the jointed rod F may be replaced with a chain, but I prefer to use the jointed rod, as operating more satisfactorily.

I claim as new, and desire to secure by Letters Patent—

The combination and arrangement of the bent lever D, spiral spring E, and jointed connecting-rod F, or its equivalent, with each other, and with the gate C and post B, substantially as herein shown and described, and for the purpose set forth.

E. R. WOLFE.

Witnesses:
JOSIAH W. ENO,
S. M. DAVENPORT.